UNITED STATES PATENT OFFICE.

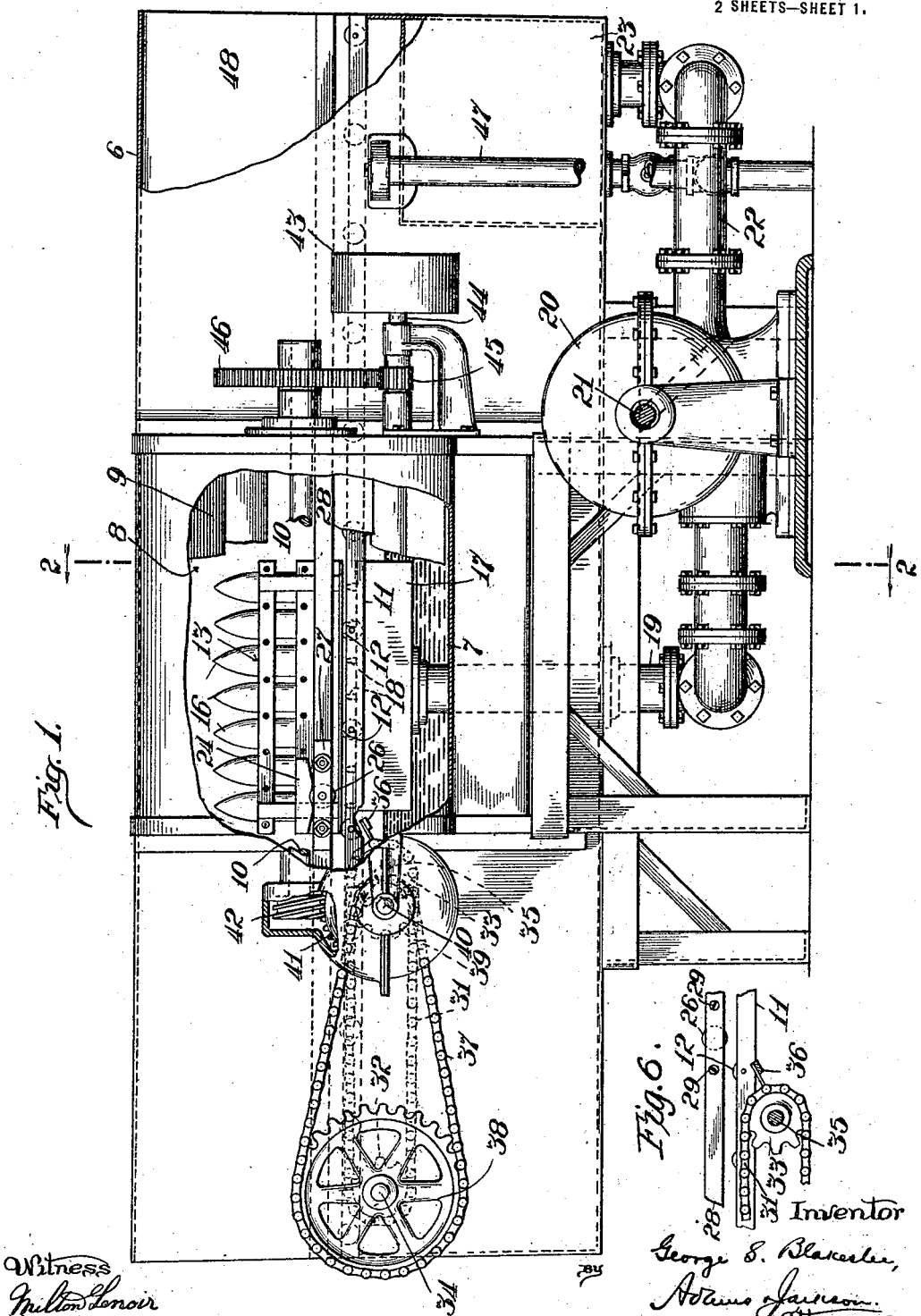

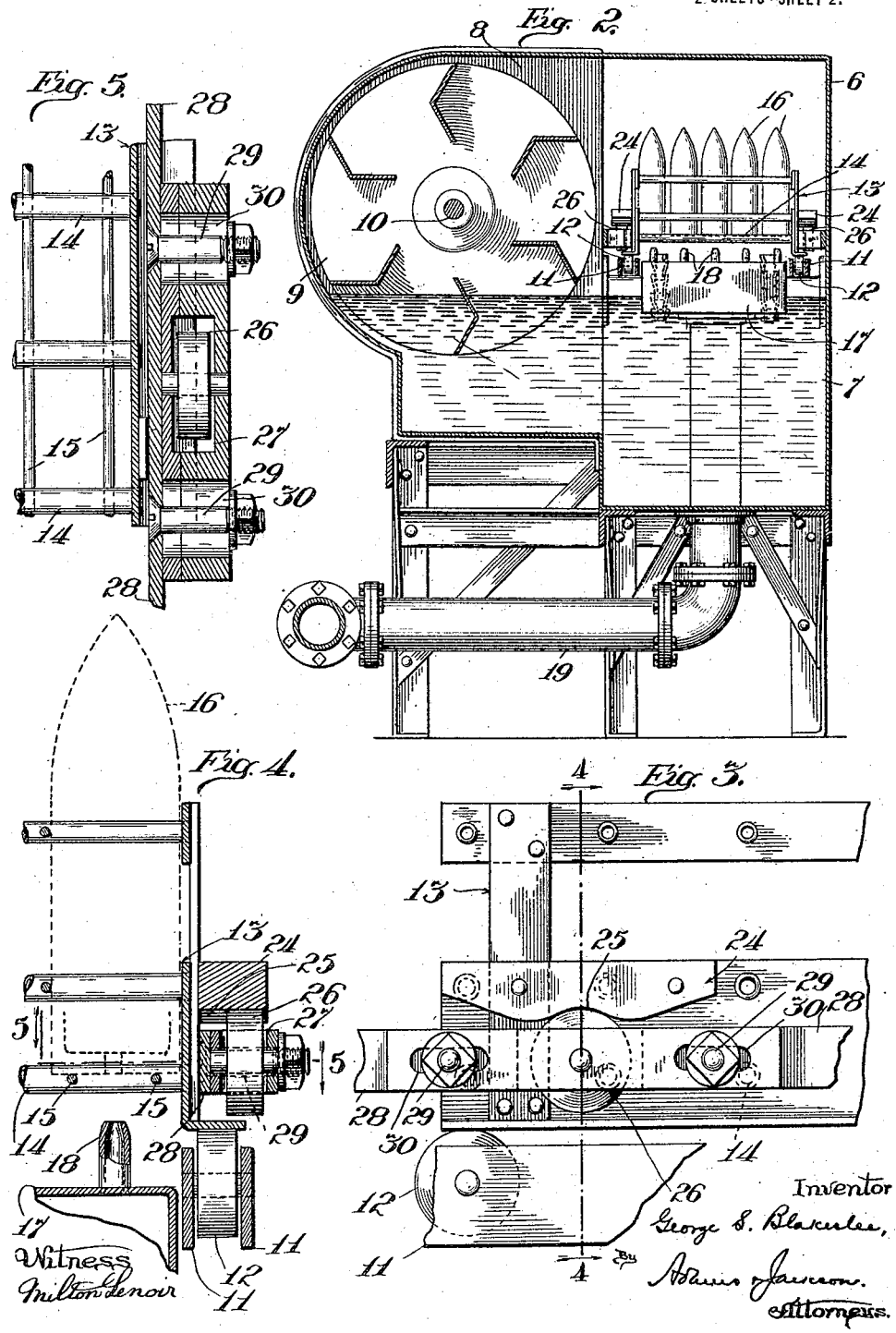

GEORGE S. BLAKESLEE, OF CHICAGO, ILLINOIS.

WASHING MACHINE.

1,406,968.          Specification of Letters Patent.          Patented Feb. 21, 1922.

Application filed June 5, 1918. Serial No. 238,269.

*To all whom it may concern:*

Be it known that I, GEORGE S. BLAKES-LEE, a citizen of the United States, and a resident of Chicago, in the county of Cook and State of Illinois, have invented certain new and useful Improvements in Washing Machines, of which the following is a specification, reference being had to the accompanying drawings.

My invention relates to washing machines designed for washing hollow articles such as shells in which access of the wash water to the interior of the article is more or less impeded. For example, in the case of shells access to the interior is had through a small opening in the center of the base of the shell and consequently ordinary washing machines cannot be successfully employed for cleansing the interior thereof, and at the same time cleansing them externally. The object of my invention is to provide a new and improved machine which will efficiently wash and scour not only the outer surfaces of such articles, but also the interior thereof so that when delivered from the machine they will be properly cleansed both externally and internally. I accomplish this object as illustrated in the accompanying drawings and as hereinafter described. What I regard as new will be set forth in the claims.

In the accompanying drawings,—

Fig. 1 is a side elevation of my improved machine, some parts being broken away;

Fig. 2 is a vertical cross-section on line 2—2 of Fig. 1;

Fig. 3 is an enlarged detail illustrating the mechanism by which the shells are properly positioned over the jets by which the wash water is injected into the interior thereof;

Fig. 4 is a cross-section on line 4—4 of Fig. 3;

Fig. 5 is a partial horizontal section on line 5—5 of Fig. 4; and

Fig. 6 is a detail showing part of the mechanism by which the baskets are moved into the tank.

My improved machine comprises an enclosed tank adapted to contain wash water over which the shells are moved, entering the machine at one end and being discharged therefrom at the other. In their progress through the machine the shells, contained in suitable openwork baskets or carriers, are supported by rails or tracks which extend out beyond the ends of the tank so that they support the baskets both before and after the washing operation. The baskets are not moved continuously through the tank, but their progress is intermittent in order that they may be allowed to remain stationary while their interior is being washed. Underneath the path of the baskets are a series of jets corresponding in number to the number of shells which the baskets are designed to contain, and these jets communicate with a chamber supplied with water under pressure by means of a suitable pump so that water is expelled forcibly through the jets in an upward direction through the openings in the bottoms of the shells, thereby scouring the interior thereof. While this operation takes place the baskets are positioned over the jets so that the latter register with the openings in the shells. At the same time wash water is thrown forcibly upon the outside of the shells by a paddle wheel located at one side of the path of the baskets and arranged to take up water from the tank and discharge it upon the contents of the basket in position over the jets. The baskets are moved through the tank by power-operated mechanism which moves them successively into position over the jets, the incoming basket operating to move the preceding basket along on the supporting rails. This propelling mechanism is connected up with the paddle wheel so that a single motor drives both. Suitable mechanism is provided for heating the water in the tank and for draining and replenishing the wash water.

Referring now to the drawings for a detailed explanation of the embodiment of my invention therein illustrated,— 6 indicates a housing the lower portion of which forms a tank 7 which contains the wash water. Said housing is open at its opposite ends for the entrance and exit of the articles to be washed, and is provided at one side with a compartment 8 adapted to contain a paddle wheel 9 mounted on a longitudinally extending shaft 10, as shown in Fig. 2. The paddle wheel is mounted so that the lower portion thereof operates in the water in the tank and it is arranged to lift water from the tank and throw it over laterally upon the articles to be washed. 11 indicates rails which extend longitudinally at opposite sides of the tank and are provided with anti-friction rollers 12 at short intervals which form a track upon which the baskets move through the tank. The rails 11 are placed a short distance above the normal water level, as shown in Fig. 2. 13 indicates one of the baskets, which are of openwork construction, their bottoms being formed of cross-bars 14 and longitudinal bars 15 which form a reticulated structure of a character suitable to support a number of shells 16 standing on end in such manner that the shells are held in certain definite positions with respect to the basket, and the centers of the bases of the shells are exposed. Each of the baskets is designed to carry a number of shells, as illustrated in Figs. 1 and 2.

17 indicates a box or chamber supported in the tank 7 below the path of the baskets and opposite the paddle wheel 9. Said box is provided with a number of nozzles 18 in its upper surface corresponding in number with the number of shells which the baskets are designed to carry, as best shown in Figs. 1 and 2. 19 indicates a water pipe one end of which extends up through the tank 7 and is connected with the box 17. Its other end is connected with a pump 20 mounted on a shaft 21 and arranged to be driven by power in any suitable way, as by an electric motor. The suction side of the pump 20 is connected by a pipe 22 with a screened chamber 23 formed at one end of the tank 7, as shown in Fig. 1, so that the pump takes water from one end of the tank and discharges it forcibly through the nozzles 18. In order that the water expelled through the jets 18 shall enter the shells it is necessary that means be provided for positioning the shells so that their openings register with the jets. For this purpose the baskets 13 are provided with positioning blocks 24 secured to opposite sides thereof, said blocks being provided with depressions 25 at their under sides, as shown in Fig. 3. These blocks are adapted to ride over positioning rolls 26 mounted in brackets 27 at opposite sides of the tank, as shown in Figs. 2 and 4. The rolls 26 are so placed that when the depressions 25 overlie said rolls the shells will be properly positioned over the nozzles 18. As shown in Figs. 2 and 5, the position of the rolls 26 may be adjusted by adjusting the brackets 27, which are secured to longitudinally extending rails 28 by bolts 29 which extend through slots 30 in said brackets, the rails 28 being secured to the sides of the tank in any suitable way. It will be apparent that when a basket is moved along upon its supporting tracks into the tank the leading or right-hand ends of the blocks 24 will ride up on the rolls 26, slightly lifting the rear ends of the basket until the bulges in advance of the depressions 25 pass over the rolls, when the rear end of the basket will descend and will finally settle with the rolls resting in such depressions, thus holding the baskets in proper position for the shells to be washed.

The baskets are moved into the tank by means of endless chains or belts 31 mounted on sprocket wheels 32—33 disposed under the rails 11 at the inlet end of the machine, said sprocket wheels being mounted on transverse shafts 34—35, respectively, as shown in Figs. 1 and 6. The belt 31 carries an outwardly projecting arm 36, as shown in Figs. 1 and 6, which is adapted to engage the rear end of the basket and push it along upon the rails 11 as the belt 31 travels, thereby moving it into the tank. The arm 36 is so proportioned that it will move the basket into the tank far enough to carry the bulges of the blocks 24 in advance of the depressions 25 slightly beyond the rolls 26 so that the basket will then move slightly further forward by gravity as the depressed portions 25 settle down on the rolls 26. This carries the basket far enough ahead so that it clears the arm 36, and consequently the basket remains stationary over the nozzles while the travel of the arm 36 is not interrupted.

The belt 31 is driven by a chain 37 operating on a sprocket wheel 38 on the shaft 34 and on a sprocket wheel 39 on a transverse shaft 40, as shown in Fig. 1. The shaft 40 is driven by means of a worm wheel 41 mounted on said shaft and meshing with a worm 42 mounted upon one end of the shaft 10 which carries the paddle wheel. The latter shaft is itself driven from a pulley 43, mounted on a shaft 44, through a pinion 45 carried by the shaft 44 and meshing with a gear 46 mounted on the shaft 10, as shown in Fig. 1. The pulley 43 may be driven by a belt from any suitable source of power.

47 indicates an overflow pipe by which the proper level of the water in the tank 7 is maintained. The usual connections may also be provided for heating the water in the tank and supplying the tank with water. In Fig. 1 I have shown the housing 6 extended to the right to form a compartment 48 into which the baskets pass after their contents have been washed. This compartment may serve as a drying compartment, or, if desired, it may be provided with a paddle wheel and nozzles, as described, for the purpose of rinsing the shells or other articles.

The operation of the machine will be readily understood from the foregoing description, but it may be summarized as follows: The operating parts of the machine being in operation, an attendant places a basket containing the shells on the left-hand ends of the rails 11 and as the arm 36 comes around by the operation of the belt 31 it engages the rear end of the basket and advances it along the rails on the anti-friction rollers 12 into the tank. When the blocks 24 reach the rolls 26 the rear end of the basket is lifted slightly until the depressions 25 are reached when the basket advances independently of the arm by gravity and settles down on the rolls 26, by which it is held in position with the holes in the bases of the shells overlying the nozzles 18. While the basket remains stationary the shells are washed externally by the wash water thrown by the paddle wheel 9 and are washed internally by the water projected through the jets 18. This continues until the next basket is placed on the rails 11 and advanced by the arm 36. The incoming basket engages the rear end of the preceding basket and forces it along on the rails 11, taking its place over the jets 18. When the outgoing basket passes beyond the end of the compartment 8 which contains the paddle wheel it is out of range of the wash water and it then dries quickly in the compartment 48, as the water used is very hot and quickly evaporates. If desired, however, the compartment 48 may be more highly heated to expedite drying.

What I claim as my invention and desire to secure by Letters Patent, is—

1. A washing machine, comprising a tank, means extending thereover for supporting the articles to be washed, means for moving such articles along said supporting means, a nozzle for directing a jet of water upward, means for engaging and arresting an article to be washed to position it over said nozzle, means for forcing water through said nozzle, and means for throwing water over upon the article to be washed.

2. A washing machine, comprising a tank, means extending over said tank for supporting the articles to be washed, a nozzle for directing a jet of water upward, means for positioning the article to be washed over said nozzle, means for forcing water through said nozzle, and a paddle wheel at one side of said supporting means for throwing water upon the article to be washed.

3. A washing machine, comprising a tank, means extending over said tank for supporting the articles to be washed, a nozzle for directing a jet of water upward, means for positioning the article to be washed over said nozzle, means for forcing water through said nozzle, and a paddle wheel at one side of said supporting means for throwing water from the tank upon the article to be washed while it is in position over said nozzle.

4. A washing machine, comprising a tank, means extending thereover for supporting the articles to be washed, means for moving such articles along said supporting means, a nozzle for directing a jet of water upward, means in the path of an article to be washed for engaging and arresting an article to be washed to position it over said nozzle, means for forcing water from said tank through said nozzle, and means for throwing water over upon the article to be washed.

5. A washing machine, comprising a tank adapted to contain water, means for moving articles to be washed over the water in said tank, a nozzle for directing a jet of water into an article to be washed, means for arresting such article in position to receive water from said nozzle, and a paddle wheel at one side of the path of the articles to be washed for throwing water from said tank upon such articles.

6. A washing machine, comprising a tank adapted to contain water, means for moving articles to be washed over the water in said tank, a nozzle for directing a jet of water into an article to be washed, means for arresting such article in position to receive water from said nozzle, a paddle wheel at one side of the path of the articles to be washed for throwing water from said tank upon such articles, and means for forcing water from said tank through said nozzle.

7. A washing machine, comprising a tank, means extending thereover for supporting baskets containing the articles to be washed, a plurality of nozzles for directing jets of water upward, means for forcing water through said nozzles, means for moving said baskets intermittently over the tank upon said supporting means, and means independent of said basket moving means for positioning the baskets over said nozzles.

8. A washing machine, comprising a tank, means extending thereover for supporting baskets containing the articles to be washed, a plurality of nozzles for directing jets of water upward, means for forcing water through said nozzles, means for moving said baskets intermittently over the tank upon said supporting means, means engaging said baskets for positioning them over said nozzles, and a paddle wheel at one side of the path of the baskets for throwing water over upon the contents thereof while they are in position over said nozzle.

9. A washing machine, comprising a tank, basket supporting means extending thereover, a basket for the articles to be washed adapted to be moved over the tank on said supporting means, a plurality of nozzles for directing jets of water into the articles to be washed, and cooperating members carried by said basket and by the tank and acting to position the basket by gravity as it is moved over the tank.

10. A washing machine, comprising a tank, stationary basket supporting means extending thereover, a basket for the articles to be washed adapted to be moved over the tank on said supporting means, a plurality of nozzles for directing jets of water into the articles to be washed, cooperating members carried by said basket and by the tank and acting to position the basket by gravity as it is moved along said supporting means, and means for moving the basket along said supporting means.

11. A washing machine, comprising a tank, means extending thereover for supporting baskets containing the articles to be washed, a plurality of nozzles for directing jets of water into the articles to be washed, a roll mounted adjacent to said basket supporting means, and a block carried by the basket and adapted to engage said roll as the basket is moved upon said supporting means, said block having a recess adapted to receive said roll for positioning the basket.

12. A washing machine, comprising a tank, means extending thereover for supporting baskets containing the articles to be washed, a plurality of nozzles for directing jets of water into the articles to be washed, a roll mounted adjacent to said basket supporting means, a block carried by the basket and adapted to engage said roll as the basket is moved upon said supporting means, said block having a recess adapted to receive said roll for positioning the basket, and means for moving the basket along said supporting means.

GEORGE S. BLAKESLEE.